United States Patent [19]

Yoshioka et al.

[11] Patent Number: 5,596,761
[45] Date of Patent: Jan. 21, 1997

[54] CENTRAL PROCESSING UNIT WITH INTERNAL REGISTER INITIALIZING MEANS

[75] Inventors: Keiichi Yoshioka, Takarazuka; Takashi Yasui, Toyonaka; Shinichi Yamaura, Takarazuka, all of Japan

[73] Assignee: Ricoh Company, Ltd., Tokyo, Japan

[21] Appl. No.: 101,399

[22] Filed: Aug. 2, 1993

Related U.S. Application Data

[63] Continuation-in-part of Ser. No. 865,365, Apr. 8, 1992, abandoned, which is a continuation of Ser. No. 546,561, Jun. 29, 1990, abandoned.

[30] Foreign Application Priority Data

Jul. 6, 1989 [JP] Japan ................... 1-175254

[51] Int. Cl.⁶ .......................................... G06F 9/00
[52] U.S. Cl. .......................................... 395/568
[58] Field of Search ........................... 395/775, 725, 395/375, 425; 364/200, 900

[56] References Cited

U.S. PATENT DOCUMENTS

| | | | |
|---|---|---|---|
| 4,228,502 | 10/1980 | Wakasugi ................... | 364/200 |
| 4,250,546 | 2/1981 | Boney et al. ................ | 364/200 |
| 4,296,470 | 10/1981 | Fairchild et al. .......... | 364/200 |
| 4,403,302 | 9/1983 | Young et al. ................ | 364/900 |
| 4,430,704 | 2/1984 | Page et al. ................. | 364/200 |
| 4,589,063 | 5/1986 | Shah et al. ................. | 364/200 |
| 4,628,448 | 12/1986 | Murao ........................ | 364/200 |
| 4,698,750 | 10/1987 | Wilkie et al. .............. | 364/200 |
| 4,800,487 | 1/1989 | Mensch, Jr. ................ | 364/200 |
| 4,831,513 | 5/1989 | Kanazawa ................... | 364/200 |
| 4,841,440 | 6/1989 | Yonezu et al. .............. | 364/200 |
| 4,930,068 | 5/1990 | Katayose et al. .......... | 364/200 |
| 4,961,067 | 10/1990 | Suzuki ....................... | 340/146.2 |
| 4,992,937 | 2/1991 | Hemmi ...................... | 364/200 |
| 5,003,466 | 3/1991 | Schan, Jr. et al. ........ | 364/200 |
| 5,007,015 | 4/1991 | Yokozama .................. | 364/900 |
| 5,021,993 | 6/1991 | Matoba et al. ............. | 364/900 |
| 5,036,458 | 7/1991 | Matsushima et al. ...... | 364/200 |
| 5,123,107 | 6/1992 | Mensch, Jr. ................ | 395/800 |
| 5,175,831 | 12/1992 | Kumar ....................... | 395/425 |
| 5,212,795 | 5/1993 | Hendry ...................... | 395/725 |
| 5,251,304 | 10/1993 | Sibigtroth et al. ......... | 395/375 |

*Primary Examiner*—Jack B. Harvey
*Assistant Examiner*—David A. Wiley
*Attorney, Agent, or Firm*—Cooper & Dunham LLP

[57] ABSTRACT

A central processing unit (CPU) carries out selected reset interruption processing by using a vector address preset in accordance with an interruption source to generate an address to a data table whose contents are used to initialize selected registers. In this manner, the CPU can be reset without having first stored the processing state of the CPU in response to a reset interrupt request, without the need for extensive dedicated reset hardware, and with the ability to select desired reset values that can differ as between different interrupts and can be changed from time to time.

6 Claims, 2 Drawing Sheets

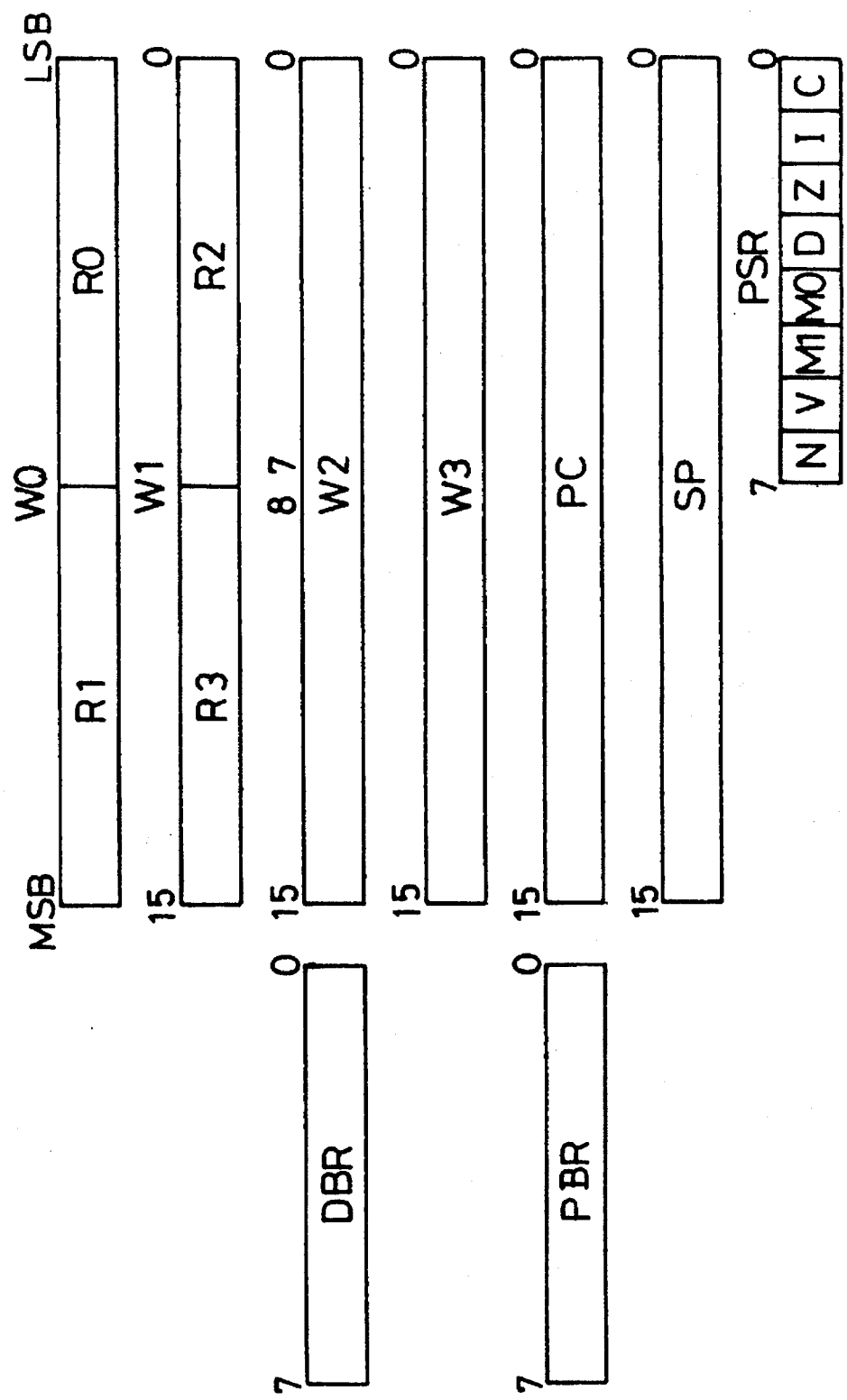

CENTRAL PROCESSING UNIT WITH INTERNAL REGISTER INITIALIZING MEANS

CROSS REFERENCE TO RELATED APPLICATIONS

This is a Continuation-In-Part Application of U.S. patent application Ser. No. 07/865,365 filed Apr. 8, 1992, now abandoned, which is a Continuation Application of U.S. patent application Ser. No. 07/546,561 filed Jun. 29, 1990, now abandoned, which are incorporated herein by reference.

BACKGROUND OF THE INVENTION

1. Field of the Invention

The present invention relates to a central processing unit with means for easily initializing an internal register.

2. Description of the Related Art

In a general central processing unit, a vector address is generated in a reset sequence and only address data showing the location of an instruction to be executed next after a resetting operation is fetched from an external data table. The vector address is also generated in an interruption sequence which is not a resetting operation after the operating state of an internal register is stored to an external stack, etc. Then, only address data showing the location of an instruction to be executed next is fetched from the external data table.

Accordingly, in such a general central processing unit, only address data showing the location of the next instruction is referred to the data table by outputting the vector address in the reset sequence. Therefore, the internal register within the central processing unit is initialized at the resetting time by one of the following two methods.

(1) A method for initializing the internal register in a program by using software means such as an instruction for loading data after the completion of the reset sequence.

(2) A method for performing an initializing operation by arranging dedicated hardware for initializing a plurality of internal registers to constant values and controlling the operation of a circuit added to the dedicated hardware at the resetting time.

In method (1), since software means is used, it is necessary to make a plurality of programs in the initializing operation after the reset sequence in a series of resetting operations (including the initializing operation). Therefore, programming size is increased and the time for executing the series of resetting operations is increased.

In method (2), it is possible to perform the initializing operation at a high speed in comparison with method (1). However, the circuit size is large since the dedicated hardware must be additionally disposed. Further, since the initialized data are fixed to a constant value, software means such as that in method (1) must be used when this value is changed to an arbitrary value.

SUMMARY OF THE INVENTION

It is therefore an object of the present invention to provide a central processing unit for initializing an internal register to an arbitrary value at a high speed at the resetting time without adding large-sized internal hardware to the register.

The above object of the present invention can be achieved by a central processing unit comprising means for reading initialization data from an external data bus upon execution of a reset interruption processing; and means for initializing internal registers based on the address data fetched by said fetching means without saving of a processing state.

The above object of the present invention can be also achieved by a central processing unit comprising means for generating a vector address in the execution of a reset interruption processing; means for fetching address data on the basis of the vector address generated by said generating means; and means for initializing a plurality of separate internal registers by the fetching means without saving of a processing state.

Further objects and advantages of the present invention will be apparent from the following description of the preferred embodiments of the present invention as illustrated in the accompanying drawings.

BRIEF DESCRIPTION OF THE DRAWINGS

FIG. 2 is a view showing the construction of registers showing programming of the central processing unit in FIG. 1.

DESCRIPTION OF THE PREFERRED EMBODIMENTS

Figure 1:
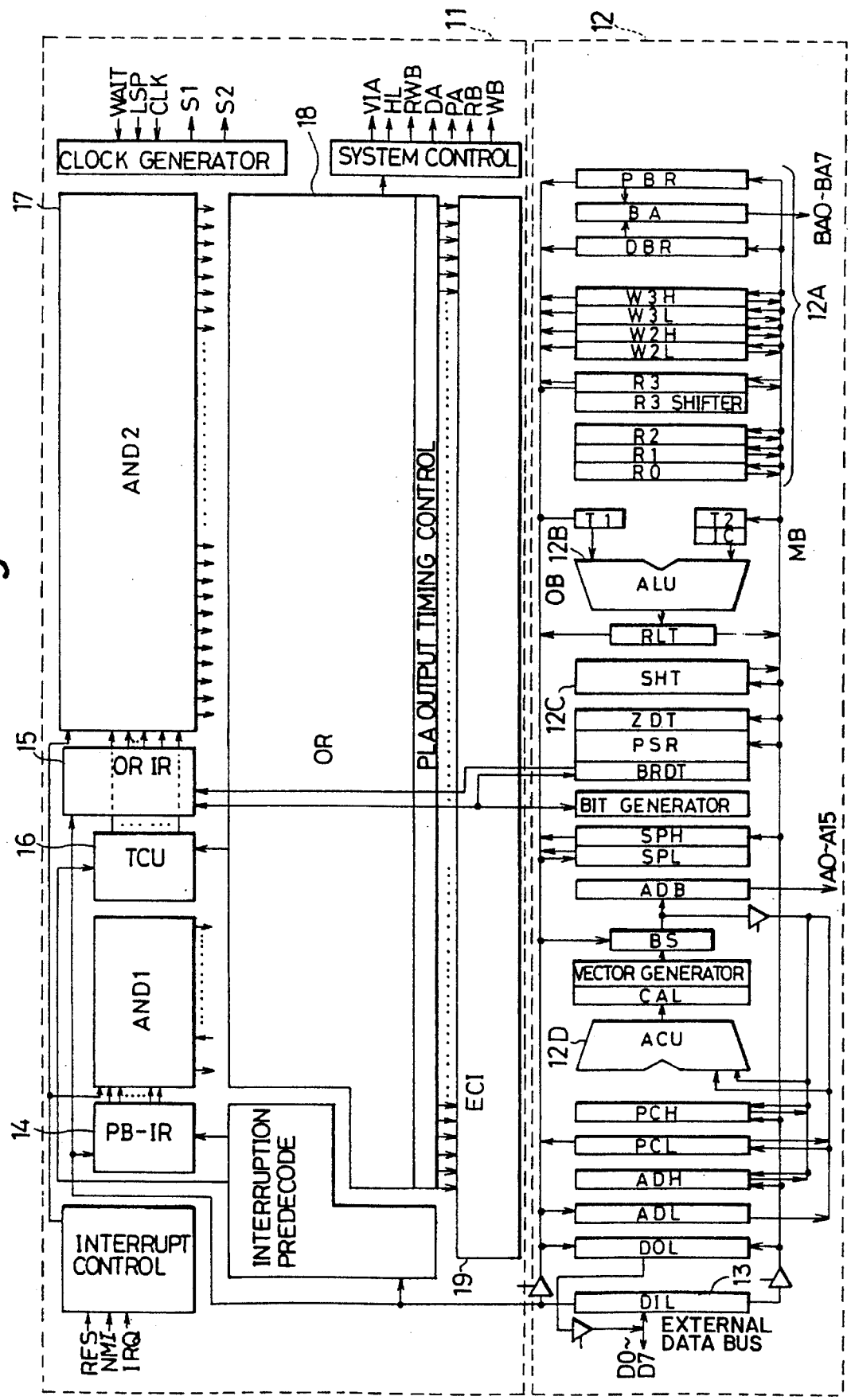
FIG. 1 is a control block diagram showing a central processing unit in one embodiment of the present invention.

The preferred embodiments of a central processing unit in the present invention will next be described in detail with reference to the accompanying drawings.

FIG. 1 shows the construction of a central processing unit in one embodiment of the present invention. FIG. 2 shows a programming model in the central processing unit.

In FIG. 2, a basic word length is 8 bits. A program counter (PC) is disposed and constructed by 16 bits in a linear access region in an address space. Data of a program bank register (PBR) outputted at an accessing time of a program region are composed of 8 bits as a means for extending the address space. Data of a data bank register (DBR) outputted at the accessing time of a data region are also composed of 8 bits as the means for extending the address space. In the bank system, an address space of 16 M bytes can be accessed by a total of 24 bits. The central processing unit has a plurality of general purpose registers (R0 to R3, W2, W3) so that it is possible to process data having different data lengths composed of 8 bits and 18 bits by an instruction.

A stack pointer register (SP) has a data length composed of 16 bits. A processor status register (PSR) shows an operating state of the central processing unit at the present time. Concretely, the operating states of respective flags N, V, Z and C are changed in accordance with the calculated results of the processing unit. Flag I shows whether or not there is a possibility that IRQ interruption is received. Mode flags M1 and M0 can discriminate bank registers, etc. (DBR, PSR, constant outputs) from each other at the accessing time of the above-mentioned data region.

The central processing unit in FIG. 1 is mainly divided into an instruction control section 11 and an arithmetic section 12.

When an instruction is executed, an instruction code is inputted to a DIL 13 through external data buses (D0 to D7). This instruction code is then stored to two instruction registers PB-IR 14, OR-IR 15 and is held until the next instruction is generated. Outputs of these instruction registers and an output of a TCU 16 for controlling the timing of an instruction sequence are inputted to an instruction decoding circuit composed of AND-OR elements. This instruction decoding circuit outputs a control signal for controlling the operation of the arithmetic section 12 through an ECI 19. The arithmetic section 12 performs an arithmetic operation therein in accordance with this control signal and receives and transmits data to the exterior thereof. The arithmetic section 12 has a group of registers 12A shown in FIG. 2, an ALU 12B, a shift register 12C and an address computing unit (ACU) 12D.

The central processing unit constructed above has a plurality of interruption sources such as sections of RES (reset), NMI, IRQ, a software interruption instruction BRK (break), etc. (see the upper left-hand side of FIG. 1). All these interruption processings are performed by a system of a fixed vector interruption processing. The fixed vector interruption processing is performed as shown in the following interruption processing sequence.

| | Interruption processing sequence | | | |
|---|---|---|---|---|
| cycle | address | data | R/W | |
| 0 | PBR, PC | OP | 1 | receive interruption instruction |
| 1 | PBR, PC + 1 | IO | 1 | |
| 2 | 00, SP − 1 | PCL | 0 | store processing state to stack |
| 3 | 00, SP − 2 | PCH | 0 | store processing state to stack |
| 4 | 00, SP − 3 | PBR | 0 | PC(PCH, PCL), PBR, PSR |
| 5 | 00, SP − 4 | PSR | 0 | |
| 6 | FF, VA | EPBR | 1 | branch data in vector address |
| 7 | FF, VA + 1 | EAH | 1 | into new program location |
| 8 | FF, VA + 2 | EAL | 1 | |
| 0 | New-PC (EPBR, EAH, EAL) | Next-OP | 1 | branch data in vector address into new program location |

In this interruption processing sequence, the processing states of the program counter (PC), the program bank register (PBR) and the processor status register (PSR) operated at the present time in the central processing unit are stored to a stack. Thereafter, a vector address preset in accordance with an interruption source is outputted. The next address to be jumped is prepared in advance in this preset vector address as a data table. The program counter (PC) and the program bank register (PBR) are updated by data read from the vector address and the address data are branched into a new program location.

The present invention particularly relates to a reset interruption processing. When a series of resetting operations are executed, the data are branched into a new program location. At this time, it is important to initialize the internal registers in the resetting operation in comparison with the NMI and the IRQ. The reasons for this are as follows. In the interruptions of the NMI, the IRQ, etc., a return interruption instruction is executed after the completion of an interruption processing routine. Then, the operating state of the central processing unit is returned to a registering state before the interruption, thereby returning to the original program. However, with respect to the resetting operation, the central processing unit is completely reset and it is not necessary to return the operating state of the central processing unit to a processing state before the resetting operation. Therefore, in general, no processing state of the central processing unit is stored to the stack in the resetting operation and only the vector address is fetched. Accordingly, in the resetting operation, it is important to perform a processing for setting the operating state of the central processing unit to a first registering state of an application program so that it is important to initialize the central processing unit.

When the reset interruption processing is executed, the vector addresses for initializing internal registers are fetched from the vector generator built into the central processing unit through the external data bus. The vector addresses are constituted by a vector address for initializing the program counter, a vector address for initializing the program bank register and a vector address for initializing the data bank register. Then, the vector address for initializing the program counter is transmitted to the program counter, the vector address for initializing the program bank register is transmitted to the program bank register, and the vector address for initializing the data bank register is transmitted to the data bank register. The above transmitting operations are performed without saving of present vector addresses stored in respectively the program counter, the program bank register and the data bank register.

Thus the initialization of the internal registers is performed without saving of a processing state of the central processing unit when the reset interruption processing is executed.

In the present invention, the following reset interruption processing sequence is executed in the resetting operation of the central processing unit.

| | Reset interruption processing sequence | | | |
|---|---|---|---|---|
| cycle | address | data | R/W | |
| 0 | PBR, PC | — | 1 | receive interruption instruction |
| 1 | FF, VA | PSR | 1 | fetch data in vector address |
| 2 | FF, VA + 1 | EDBR | 1 | fetch data in vector address |
| 3 | FF, VA + 2 | EPBR | 1 | fetch data in vector address |
| 4 | FF, VA + 3 | EAH | 1 | initialize PSR, DBR, PBR and PC |
| 5 | FF, VA + 4 | EAL | 1 | |
| 0 | New-PC (EPBR, EAH, EAL) | Next-OP | 1 | |

Namely, new location data (PCL, PCH, PBR) and data of the data bank register (DBR) and the processor status register (PSR) are fetched from the data table of the vector address and are stored to a storing section. All these sequence controls are performed by a control signal decoded by the above-mentioned instruction control section. There is no hardware for performing only the resetting operation within the processor status register (PSR) and the data bank register (DBR). Accordingly, the above sequence controls are performed by loading external data to the registers. The interruption processing sequence is executed in the other interruptions such as the NMI, the IRQ, etc.

In the above embodiment, the processor status register (PSR) and the data bank register (DBR) are initialized. However, it is also possible to initialize another internal register such as a general purpose register by using external data in the reset sequence.

As mentioned above, in the present invention, the external data are fetched in the reset sequence to initialize an internal register of a bank register such as the data bank register (DBR), the program bank register (PBR), etc. Accordingly, it is not necessary to dispose dedicated hardware for initializing the internal register to a constant number. Therefore, circuit size can be small and the number of initializing operations in a program can be reduced so that the time for executing the resetting operation can be reduced. Further, the internal register can be initialized to an arbitrary value by rewriting a table of the external data.

Many widely different embodiments of the present invention may be constructed without departing from the spirit and scope of the present invention. It should be understood that the present invention is not limited to the specific embodiments described in the specification, except as defined in the appended claims.

What is claimed is:

1. A central processing unit comprising:

means responsive to a reset interrupt signal and independent of dedicated circuitry for fetching arbitrary initialization data from an external data bus connected thereto, said internal registers including a program counter and a data bank register; and means responsive to said interrupt signal for initializing said internal registers based on the initialization data fetched by said fetching means, said initializing means is configured to independently initialize said internal registers without saving a processing state of said central processing unit.

2. A central processing unit comprising:

means for generating a vector address defining address data indicative of a location of a program to be executed upon receipt of a selected reset interrupt signal;

means associated with said generating means and independent of dedicated circuitry for fetching the address data on the basis of the vector address generated by said generating means; and means responsive to said interrupt signal for initializing internal registers including a program counter and a data bank register, based on the address data fetched by said fetching means, said initializing means being configured to independently initialize said internal registers without saving a processing state of said central processing unit.

3. A central processing unit according to claim 2, in which the internal registers comprise a data register and a program bank register.

4. A central processing unit according to claim 2, in which the means for initializing the internal registers includes means for initializing the internal registers to an arbitrary value by another address state.

5. A central processing unit comprising:

a program counter for generating a first signal indicating an instruction address based on vector address data supplied thereto;

a program bank register for generating a second signal indicating a program address based on vector address data supplied thereto;

a data bank register for generating a third signal indicating a data access address based on vector address data supplied thereto;

means for generating first, second and third vector address data in order to respectively initialize said program counter, said program bank register and said data bank register; and means responsive to interrupt reset processing and independent of dedicated circuitry for fetching the respective first, second and third vector address data from said generating means, and for transmitting respectively the fetched first vector address data to said program counter, the fetched second vector address data to said program bank register and the fetched third vector address data to said data bank register, so as to independently initialize said program counter, said program bank register and said data bank register without saving said first, second and third vector address data before they are transmitted.

6. A central processing unit according to claim 5, further comprising a processor status register for storing at least one signal indicating an operating state of said central processing unit.

* * * * *